United States Patent [19]

Veltman et al.

[11] 4,004,991
[45] Jan. 25, 1977

[54] TWO-STAGE PRESSURE LEACHING PROCESS FOR ZINC AND IRON BEARING MINERAL SULPHIDES

[75] Inventors: Herbert Veltman, Fort Saskatchewan; Geoffrey James Julien Mould, Flin Flon; Paul Kawulka, Fort Saskatchewan, all of Canada

[73] Assignee: Sherritt Gordon Mines Limited, Toronto, Canada

[22] Filed: Dec. 12, 1975

[21] Appl. No.: 640,292

[30] Foreign Application Priority Data

Oct. 22, 1975 Canada ................................. 238439

[52] U.S. Cl. .............................................. 204/119
[51] Int. Cl.² ......................................... C25C 1/16
[58] Field of Search ............................ 204/119, 104

[56] References Cited

UNITED STATES PATENTS

| | | | |
|---|---|---|---|
| 2,996,440 | 8/1961 | Forward et al. | 204/119 |
| 3,867,268 | 2/1975 | Kawulka et al. | 204/119 |

*Primary Examiner*—R. L. Andrews
*Attorney, Agent, or Firm*—Frank I. Piper; Arne I. Fors; Robert F. Delbridge

[57] ABSTRACT

Direct pressure leaching of zinc and iron containing mineral sulphides in dilute $H_2SO_4$ is carried out in a two-stage countercurrent process in which finely divided sulphides are leached in a first leaching stage with solution from the second leaching stage to produce a first stage leach solution containing a high zinc concentration and low iron and $H_2SO_4$ concentrations. The first stage solution, after suitable purification treatment, may be treated for zinc recovery by conventional electrowinning. The residue from the first stage leach is pressure leached with return electrolyte from the electrowinning operation with the leach end solution being passed to the first stage leach as already stated. The acid and sulphides concentrations in each of the first and second leaching stage is controlled such that (1) sufficient acid and sulphides enter the leaching circuit to ensure that the final leach solution exiting from the first leaching stage will contain sufficient dissolved zinc, e.g., 140–180 g.p.l., to make it suitable for treatment by electrolysis for recovery of zinc therefrom, (2) the quantity of sulphides entering the first stage leach is in excess of the quantity required to react with all available acid in the solution recycled from the second leaching stage and (3) the quantity of free acid entering the second leaching stage is in excess of the quantity required to react stoichiometrically with all acid reactive constituents in the residue passed from the first leaching stage to the second leaching stage.

6 Claims, 1 Drawing Figure

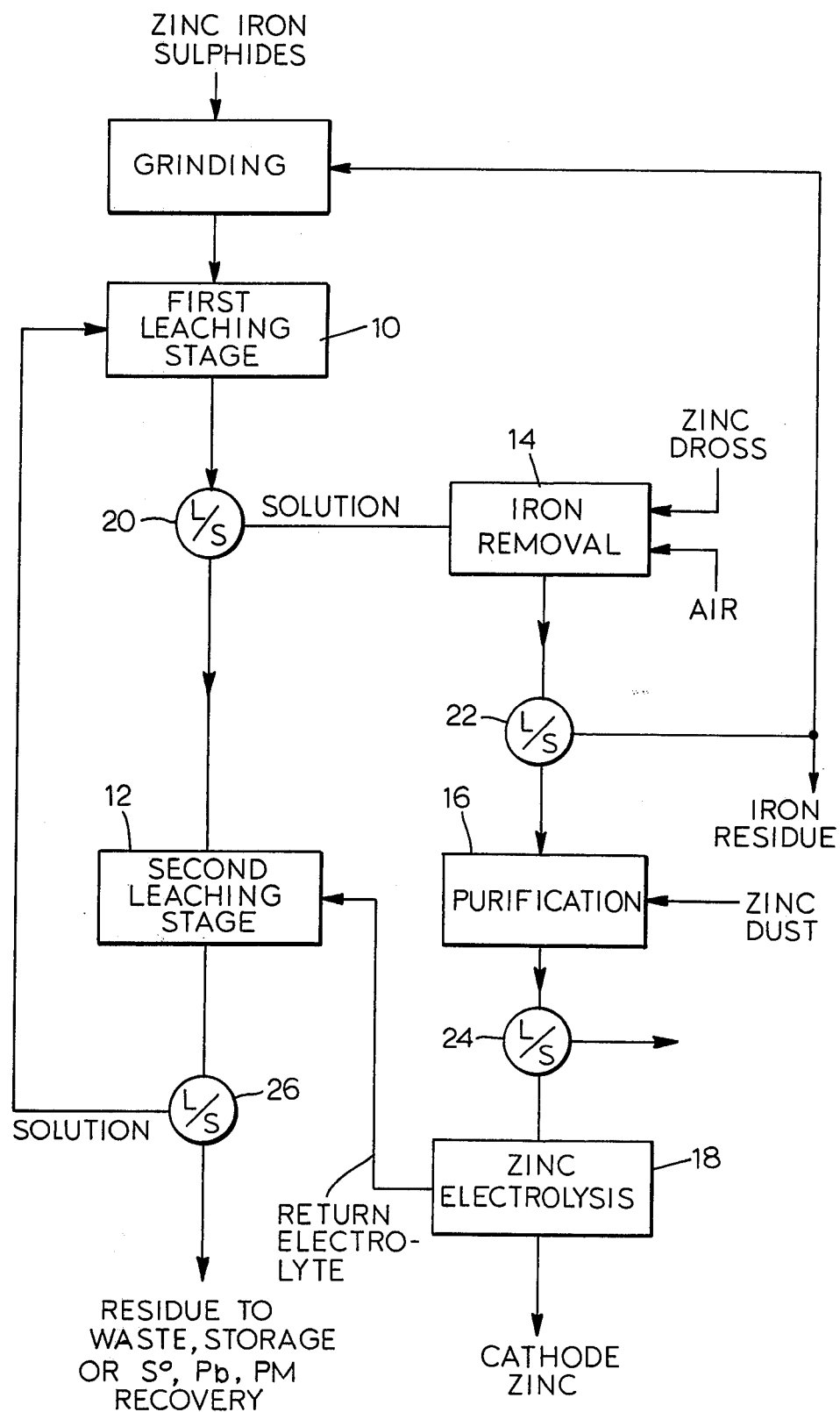

TWO-STAGE PRESSURE LEACHING PROCESS FOR ZINC AND IRON BEARING MINERAL SULPHIDES

This invention relates to a process for the extraction of zinc from zinc and iron bearing sulphides and, more particularly, relates to a two-stage hydrometallurgical pressure leaching process for the recovery of zinc values from zinc sulphide ores and concentrates with concomitant conversion of sulphide sulphur associated with the recovered zinc to elemental form.

It is well known, as described in U.S. Pat. No. 2,996,440, to extract zinc from zinciferous mineral sulphides by reacting the sulphides with aqueous sulphuric acid in the presence of an oxygen bearing gas at elevated temperature and pressure. In the process of this patent, the sulphides, in finely divided form, are slurried in aqueous sulphuric acid solution containing free sulphuric acid in amount at least sufficient to combine with the zinc content of the sulphides to form zinc sulphate. The slurry is agitated and maintained at an elevated temperature below the melting point of sulphur under an overpressure of oxygen until extraction of zinc from the mineral sulphides and concurrent oxidation of sulphide sulphur to elemental sulphur is substantially complete. The leach solution, after purification, is suitable for treatment by conventional procedures, such as electrolysis, for the recovery of product zinc, and the sulphur, which reports in the leach residue in elemental form, can be recovered therefrom as a by-product of the process.

According to this prior art process the leaching reaction is conducted at a temperature below the melting point of sulphur, i.e., below about 119° C. The temperature may optionally be raised above this point and up to about 160° C. after leaching is complete, but if temperatures above the melting point of sulphur are employed in the leaching step, elemental sulphur formed in the oxidation reaction is present in the slurry as liquid sulphur globules. Zinc sulphide particles in the slurry are "wetted" by these liquid sulphur globules and are occluded therein with the result that the particles are shielded from further oxidation and the sulphides leaching reaction comes to a standstill. While the use of a temperature below the melting point of sulphur in the leaching step avoids this problem, it has the disadvantage that the retention time required to effect substantially complete extraction of zinc values from the sulphides is undesirably prolonged.

U.S. Pat. No. 3,477,927 discloses the pressure leaching of zinciferous sulphides under oxidizing conditions at a temperature above the melting point of sulphur, i.e., above 119° C., in a slurry containing less sulphuric acid than that required to provide sulphate ions to combine as zinc sulphate with all the zinc contained in the sulphides. These conditions result in a rapid rate of reaction. For example, with appropriate adjustment of the acid and sulphides concentrations, a "target" zinc concentration of 150 g.p.l. in solution can be reached and the free acid and dissolved iron concentrations reduced to low values with a retention time of about two hours. The leach solution which is obtained is suitable for direct treatment in subsequent iron removal, purification and zinc electrowinning operations. The residue, which contains elemental sulphur, unreacted sulphides and hydrated iron oxide, is treated first to separate the elemental sulphur plus sulphides fraction from the hydrated iron oxide fraction which is discarded as final process residue. The elemental sulphur-sulphides fraction is further treated to separate the sulphur from the sulphides and the latter is recycled to the pressure leaching step where it behaves like the fresh sulphides fed to the leaching step while the former constitutes a by-product of the process.

Whereas the process just described avoids many of the problems of the earlier process of U.S. Pat. No. 2,996,440, it nonetheless has certain inherent disadvantages. One of these is that the operations involved in separating unleached sulphides from the leach residue and the elemental sulphur become uneconomic when the price of elemental sulphur is very low (as it frequently is) and/or where the residue does not contain other values, such as precious metals, in quantities sufficient to offset, at least in part, the cost of residue treatment. Another disadvantage is that all zinc sulphide concentrates are not equally amenable to the process. With some concentrates it has been found that even under optimum conditions, the leaching reaction does not proceed to completion as rapidly as is desired with the results that unduly long retention times are required to produce a solution with the desired zinc concentration and suitably low acid and dissolved iron concentrations.

The present invention provides a direct pressure leaching process which is effective for treating a wide variety of zinc-bearing sulphides to extract zinc and produce elemental sulphur without the attendant problems of the prior art processes as discussed above.

More specifically, the invention provides an improvement in the process for recovering zinc from zinc and iron-containing mineral sulphides in which the sulphides, in finely divided form, are pressure leached with aqueous sulphuric acid solution under oxidizing conditions to convert sulphide sulphur to elemental form and produce a zinc sulphate bearing leach-end solution which, after purification, is subjected to electrolysis to recover cathode zinc and produce a return electrolyte containing residual zinc values and sulphuric acid. According to the improvement of this invention relatively rapid and substantially complete extraction of zinc is obtained with production of a low iron and low free acid leach end solution by leaching the sulphides under a positive partial pressure of oxygen and at a temperature above about 135° C. but below about 175° C. in two countercurrent stages with the mineral sulphides being fed into the first of the two leaching stages and the return electrolyte being fed into the second of said two leaching stages. The quantity of sulphides fed to the first leaching stage is adjusted and co-related relative to the quantity of acid fed to the second leaching stage with the return electrolyte such that at least one mole of zinc in sulphide form enters the first leaching stage for each mole of acid entering the second leaching stage while, at the same time, the quantity of return electrolyte entering the second leaching stage is controlled such that about 1 mole of acid enters for each mole of zinc that must be extracted from the sulphides and dissolved in the electrolyte to increase the zinc concentration thereof to a predetermined level suitable for treatment in the electrolysis operation. The first leaching stage is continued to extract zinc values from the mineral sulphides with concurrent conversion of sulphide sulphur to elemental sulphur and to produce a first stage leach residue containing unreacted sulphides, elemental sulphur and precipitated iron and a leach solution containing dissolved zinc, less than about 3 g.p.l. free sulphuric acid and less than about 2 g.p.l. of dissolved iron. The leach solution from the first stage leach is passed first to purification and then to zinc electrolysis and the first stage leach residue is passed to the second leaching stage. The second leaching stage is continued to extract substantially all zinc from the first stage leach residue and to produce a second stage leach residue containing any unreacted sulphides, elemental sulphur and precipitated iron and a second stage leach solution containing extracted zinc, unreacted sulphuric acid and dissolved iron. The second stage leach solution is separated from second stage leach residue and passed to the first leaching stage.

While the process appears relatively simple in concept, surprising and important advantages derive from it. The two-stage countercurrent leaching procedure together with the relatively high leaching temperatures and the specified control of the quantity of mineral sulphides entering the first leaching stage relative to the quantity of acid entering the second leaching stage ensures that in the second leaching stage there is an excess of acid over that required to combine stoichiometrically with all the acid-reactive constituents in the first stage leach residue entering the second leaching stage whilst in the first leaching stage there is a deficiency of acid under that required to combine stoichiometrically with all the acid-reactive constituents in the mineral sulphides fed to the first leaching stage. This, in turn, ensures substantially complete extraction of zinc values from the feed material with minimum retention time while also ensuring that the product leach solution has desirably low levels of dissolved iron and free acid.

The process of the invention is applicable to either high or low grade material containing zinc-iron sulphides. However, the starting material normally will be a high grade zinc and iron containing sulphide concentrate obtained by selective froth flotation of zinc bearing sulphide ores. Such concentrates will often contain other non-ferrous metals in addition to zinc. For example, a typical zinc sulphide concentrate may include some copper, lead, nickel and/or cobalt, cadmium and, in many cases, precious metals. It is to be understood, therefore, that the use of the terms "iron containing zinciferous sulphides" or simply "sulphides" herein is intended to include such materials and is also intended to include any other high or low grade materials which contain iron, either as a naturally occurring or added constituent, and economically recoverable quantities of zinc in sulphide form.

In order to obtain optimum results by treatment by the process of the invention, the sulphidic starting material preferably should be in finely divided particulate form. It is preferable, in order to realize the full benefits of the invention, that the starting material be about 90% minus 325 mesh standard Tyler screen and, more preferably, about 97% minus 325 mesh standard Tyler screen. Material such as flotation concentrates may, in some cases, already be within the preferred size range. Material not already of the preferred size is preferably first pulverized such as by grinding in a wet ball mill or the like.

As shown in the accompanying drawing, there are five basic operations involved in the process. A first leaching stage, indicated by numeral 10, second leaching stage 12, iron removal 14, solution purification 16 and zinc electrolysis 18. Also included are liquid-solids separation steps 20, 22, 24 and 26 following the first leaching stage 10, the iron removal step 14, the purification step 16 and the second leaching stage 12, respectively.

In carrying out the process of the invention, the sulphides, after pulverization if necessary, are slurried with leach end solution recycled from the second leaching stage 12 and the resulting slurry is passed to the first leaching stage 10. Preferably, the feed slurry for the first leaching stage 10 is prepared on a continuous basis in a separate slurry make-up step, not shown, in which the sulphides are dispersed in the solution at ambient temperature and pressure. Where the sulphides are iron-free or iron deficient, the iron content may conveniently be adjusted at this point by the addition of iron to the slurry. The iron may be provided in the slurry in the form of finely divided iron particles or in the form of a compound which is capable of dissociation in the solution under oxidizing conditions to yield ferrous and/or ferric ions. The preferred iron additive compounds are ferric oxide, pyrrhotite and marmatite. Generally, the amount of iron or iron compound added should be sufficient to raise the total oxidizable iron content of the slurry to between about 5 and about 15 wt. % of the zinc content, i.e., preferably there should be from about 1 to about 3 grams of iron for every 20 grams of zinc in the slurry.

The pulp density of the slurry fed to the first leaching stage 10, i.e., the relative quantities of sulphides and solution provided in the first leaching stage in any given case, is determined having regard to the zinc content of the sulphides and the desired zinc concentration of the final leach solution. In general, it is desirable to operate at a pulp density within the range of about 20 to about 50%. The reaction rate decreases as pulp density is increased beyond the level where optimum dispersion of the solids and oxygen in the solution can be maintained and, of course, the overall efficiency of the process is reduced if the pulp density is too low.

An essential feature of the process is the control of the acid and sulphides concentrations in each of the first and second leaching stages such that (a) sufficient acid and sulphides enter the leaching circuit to ensure that the final leach solution exiting from the first leaching stage 10 will contain sufficient dissolved zinc, e.g., 140–180 g.p.l. to make it suitable for treatment by electrolysis for recovery of zinc therefrom, and (b) the quantity of sulphides entering the first stage leach 10 is in excess of the quantity required to react with all available acid ** in the solution recycled from the second stage leach 12, and (c) the quantity of free acid entering the second stage leach is in excess of the quantity required to react stoichiometrically with all acid reactive constituents in the residue passed from the first leaching stage to the second leaching stage.

** available acid means free sulphuric acid plus sulphuric acid that would result if all the ferrous and ferric iron in solution precipitated from solution as Fe(OH)$_3$.

According to the invention, each of these requirements is met by adjusting and co-relating the quantity of sulphides fed into the first leaching stage 10 relative to the quantity of acid fed to the second leaching stage 12 such that at least 1 mole of zinc in sulphide form enters the first leaching stage for each mole of acid entering the second leaching stage. At the same time, the amount of return electrolyte (and consequently the amount of acid) entering the second leaching stage is controlled such that about 1 mole of acid enters for each mole of zinc that must be extracted from the sulphides and dissolved in the electrolyte to increase the zinc concentration thereof to a predetermined level suitable for treatment in the electrolysis step. The exact quantity return electrolyte fed to the second leaching stage in any specific case will depend on a number of factors including the quantity of residual zinc in the return electrolyte (usually 40–60 g.p.l.), the quantity of acid consuming constituents, such as lead, in the feed material, the quantity of acid generated during leaching and the overall zinc extraction efficiency. In most cases, it is found that from about 0.9 to about 1.2 moles of free acid should be supplied to the second leaching stage for each mole of zinc that must be extracted. Since the return electrolyte contains an amount of free sulphuric acid equivalent to the amount of zinc recovered in metallic form in the electrolysis step 18, once the process is operating on a continuous basis the desired acid balance may be maintained simply by operating the first and second leaching steps under conditions as discussed herein after which generate just sufficient acid to compensate for the mechanical losses and for that consumed in non-reversible reactions by acid reactive substances such as lead and calcium.

Adjustment and co-relation of the quantity of sulphides fed to the first leaching stage and the quantity of free acid fed to the second leaching stage in the manner just described ensures that in the first leaching stage there is a deficiency of acid under that required to combine with all the zinc and other acid reactive constituents in the sulphides and in the second leaching stage there is an excess of acid over that required to combine with all acid reactive constituents in the residue from the first leaching stage. The result is that in the first stage, the pH rises, e.g., to 2–3 or higher, as the reaction proceeds and this, in turn, promotes rapid hydrolysis and precipitation of dissolved iron from the leach end solution discharged from the first leaching stage 10. While only a relatively small amount of zinc, e.g., about 25 wt. %, will be extracted from the sulphides in the first leaching stage, the total zinc content of the final solution will be at the desired level since the solution entering the first leaching stage from the second leaching stage will be high in dissolved zinc. For example, in a typical case, the solution recycled from the second leaching stage will contain 130 g.p.l. Zn, 10 g.p.l. Fe, and 30 g.p.l. $H_2SO_4$ and the product leach solution leaving the first leaching stage will contain 160 g.p.l. Zn, less than 1 g.p.l. Fe and less than 2 g.p.l. $H_2SO_4$. In the second leaching stage, because there is an excess of acid over that required to combine with the acid-reactive constituents in the first stage leach residue fed thereto, strongly acidic conditions prevail which enable rapid and substantially complete, i.e., 97 wt. % or more, extraction of zinc values from the residue.

Each of the first and second leaching stages is carried out in agitation-equipped pressure vessels, such as autoclaves, at a temperature above the melting point of sulphur, i.e., above about 135° C., but below about 175° C. At temperatures below about 135° C. the reaction rates are relatively slow thereby adversely affecting the economics of the process. During the oxidation reaction, some elemental sulphur is converted to sulphuric acid. Preferably, the operating temperature should be about 140° to about 160° C. As previously noted, however, generation of some acid is desirable in most cases to compensate for mechanical acid losses and to replace make-up acid consumed in irreversible side reactions by diluent metals such as lead and gangue materials such as calcium and magnesium. At temperatures above about 175° C. elemental sulphur is converted to sulphuric acid at a relatively rapid rate and, therefore, more sulphuric acid than desired to maintain acid balance may be produced. The leaching reactions are exothermic and produce enough heat to maintain the slurry within the preferred temperature range without addition of heat from an extraneous source once the reactions have been initiated.

The total pressure at which the first and second leaching stage reactions are conducted is the pressure autogenously generated at the temperature of the oxidation reaction plus the overpressure of oxidizing gas. Preferably, the oxidizing gas is oxygen but air or oxygen enriched air may also be used. The reaction proceeds satisfactorily with an oxygen overpressure above about 20 kPa. However, there is an improvement in reaction rate as the oxygen overpressure is increased. Thus, it is preferred to use an overpressure of oxygen above about 100 kPa and preferably about 150 to 400 kPa. The upper limit of oxygen pressure will be that imposed by the apparatus employed. As it is generally desirable, for economic reasons, to avoid the use of costly high pressure apparatus, generally the upper limit will be about 1000 kPa oxygen overpressure or air overpressure.

Preferably, a small amount of surface active compound is added to the leach slurry in the first and/or second leaching stages. As described in detail in U.S. Pat. No. 3,867,268, such compounds as sodium and calcium lignosulphate, tannin compounds and alkylaryl sulphonates serve to improve extractions of zinc during pressure acid oxidation at elevated temperatures above the melting temperature of sulphur. For purposes of the present process, a preferred additive is quebracho extract added in the second leaching stage in amount of at least about 0.1 g.p.l. and preferably about 0.25 g.p.l.

The first stage leaching reaction is continued until substantially all the available acid in the first stage leach solution has been consumed by the sulphides and the pH of the leach end solution is about 1.5 or higher, preferably about 2–3, and the iron content is less than 2 g.p.l., preferably less than 0.5 g.p.l. The actual leaching time required to reach this point will vary for each case depending on the specific nature of the sulphides being treated, as well as the operating and equipment design details. In general, however, a first stage leach end solution containing less than 1.0 g.p.l. sulphuric acid and less than 2.0 g.p.l. iron is obtained in about 40–60 minutes.

In the second leaching stage 12, the leaching reaction is continued to obtain substantially complete extraction of zinc values from the first leaching stage residue. In general, it is found that from about 40 minutes to about 120 minutes is sufficient to obtain zinc extractions of 98% or better.

When the second stage leaching is completed, the final leach slurry is discharged from the leaching vessel into a flash tank and then is further flashed into a vessel at atmospheric pressure. The leach solution in the slurry discharged from the second stage leaching vessel normally will contain approximately 100 to 140 g.p.l. zinc, 5 to 25 g.p.l. iron and 10 to 50 g.p.l. sulphuric acid. The leach solution is separated from the undissolved residue in conventional liquids-solids separation step 26 and is passed in its entirety to the first leaching stage 10. The residue from the second leaching stage contains all of the elemental sulphur produced in both leaching stages as well as a small amount of unleached sulphides, hydrated iron oxide, insoluble gangue materials and any precious metals present in the starting material. This residue may be discarded to waste, stored for future treatment or treated immediately for recovery of elemental sulphur and any other economically recoverable values such as lead. In addition, an important feature of the process is that substantially all precious metals contained in the starting material will report in the final residue in greatly concentrated form. The process thus provides a simple but effective means for recovering precious metals from precious metal bearing zinc sulphide concentrates as a valuable by-product.

The leach end solution from the first leaching stage 10, after separation from the undissolved residue in liquid-solids separation step 20 is passed to iron removal operation 14. Preferably, iron removal is effected by contacting the solution with zinc oxide or dross and air. Other acid neutralizing reagents such as zinc calcine, lime or limestone, may also be used where circumstances warrant it. It should be noted here that since the iron and free acid levels of the leach end solution from the first leaching stage are already low, only very small amounts of neutralizing agent will be required in the iron removal step as compared to the prior art processes.

Following iron removal, the solution is passed to purification step 16 and, after removal of impurities in liquid-solids separation step 24, is passed to zinc electrolysis 18. Each of these steps is conducted in accordance with well known, conventional procedures which, in themselves, form no part of the present invention.

Return electrolyte from electrolysis step 18 which contains residual zinc values, e.g., 40–60 g.p.l. and regenerated sulphuric acid equivalent to 1 mole for each mole of metallic zinc produced, is passed to the second leaching stage 12 thereby completing the closed-circuit process of the invention.

The process of the invention is further illustrated and explained by the following example.

EXAMPLE 1

A test was conducted using a zinc concentrate analyzing Zn — 45.8%, Cu — 0.7%, Fe — 14.1%, Cd — 0.1%, Pd — 0.2%, $S_{(Total)}$ — 33.9%, Mn — 0.1%, Mg — 0.3%, As — 0.2%, Ca — 0.2%, Al — 0.16%, $SiO_2$ — 1.2%, and Insol — 1.8%. A 1,000 gram sample of this concentrate was slurried in 300 cm³ water and ground for 100 minutes in a ceramic ball mill to substantially 95% minus 325 mesh Tyler screen. The screen analysis for ground and unground material is shown in Table 1.

TABLE I

| Screen Size Tyler Mesh | Concentrate Unground % Retained | Ground % Retained |
|---|---|---|
| 100 | 9.0 | 0.0 |
| 150 | 18.1 | 0.0 |
| 200 | 27.1 | 0.2 |
| 325 | 50.2 | 3.1 |

A 1070 gram sample of the dried, ground concentrate was then slurried with 4.9 liters of an acid solution obtained from a second stage leaching operation conducted in the manner described below. This solution contained 121 g.p.l. Zn, 17.2 g.p.l. $H_2SO_4$ and 9.3 g.p.l. Fe. The resulting slurry, which contained 4.49 moles of Zn in the solids for each mole of available acid** in the solution into a 10 liter lead lined autoclave equipped with a titanium agitator and other internal hardware. The slurry was heated under moderate agitation (600 rpm) under a 206 kPa partial pressure of oxygen to 139° C. and maintained at the temperature for 30 minutes. The leach end slurry from this first stage leach was discharged from the autoclave and the solution separated from the undissolved residue by filtration. The dried, undissolved residue weighed 984 g and analyzed 36.6% Zn, 15.9% Fe and 36.4% S. This solution, which had a pH of 2 and contained 150 g.p.l. Zn, 0.47 g.p.l. $H_2SO_4$ and 0.96 g.p.l. Fe was subjected to purification by adding 4 g.p.l. limestone to raise the pH to 5.5. The solution was held at 82° C. for 1.4 hours while sparging with oxygen. The temperature of the iron-free solution was then raised to 85° C. and pH adjusted to 4. Zinc dust, copper sulphate and arsenous oxide were added as shown in Table 2.

** Available acid is free $H_2SO_4$ plus $H_2SO_4$ that would result if all the ferrous and ferric iron in solution precipitated from solution as Fe(OH)$_3$

TABLE 2

| | FIRST STAGE PURIFICATION | | | |
|---|---|---|---|---|
| Time | Temperature °C. | Zinc Dust (coarse) (gm/l) | $CuSO_4.5H_2O$ gm/l | $As_2O_3$ gm/l |
| 0 | 85 | 2.19 | 0.17 | 0.16 |
| 30 | 88 | 1.56 | — | — |
| 60 | 92 | 1.25 | 0.07 | 0.04 |
| 90 | 95 | 0.62 | — | — |
| 120 | 95 | 0.31 | 0.06 | 0.04 |
| 150 | 95 | 0.31 | — | — |

The solution was filtered and its temperature lowered to 80° C. The pH was adjusted to 4 and zinc dust and copper sulphate added as shown in Table 3.

TABLE 3

| Time (Mins) | Temperature °C. | Zinc Dust (fine) (gm/l) | $CuSO_4.5H_2O$ gm/l |
|---|---|---|---|
| 0 | 85 | 1.85 | 0.30 |
| 30 | 81 | 1.54 | — |
| 60 | 77 | 0.92 | — |
| 90 | 73 | 0.62 | — |
| 120 | 70 | 0.31 | — |

The solution obtained after purification was filtered and the filtrate subjected to electrowinning using a 3-liter plating test cell equipped with two Pb-Ag anodes and an aluminum cathode using a metallic rectifier as direct current source. On applying 0.043 amps/cm² for 24 hours, easily strippable zinc deposits were obtained analyzing the following impurities (%): Cu — 0.0005, Pb — 0.0007, Cd — 0.0002 and Fe — 0.0002.

The depleted electrolyte contained 50 g.p.l. Zn and 150 g.p.l. $H_2SO_4$.

An artificial return electrolyte was prepared having the same free acid and zinc analysis as the depleted electrolyte from the Zn electrolysis described above and 974 g of the residue from the first stage leaching described above was slurried with 4.85 liters of this solution thus providing 1.36 moles of free acid per mole of zinc in the residue. 0.5 g.p.l. quebracho was added to the mixture and second stage leaching was carried out in the same manner as described above for the first leaching for 30 minutes. The leach end slurry was discharged and the solution separated from the undissolved residue, which weighed 532 g and analyzed 1.03% Zn, 21.8% Fe, 159.8% $S_{(Total)}$ and 42% S(elemental). From this analysis, calculated zinc extraction was 98.9% and 61.5% of the sulphide sulphur was converted to elemental form. The solution separated from the second stage leach residue was essentially the same composition as that used in the previously described first stage leach.

What we claim as new and desire to protect by Letters Patent of the United States is:

1. In a process for recovering zinc from zinc and iron-containing mineral sulphides in which the sulphides, in finely divided form, are pressure leached with aqueous sulphuric acid solution under oxidizing conditions to convert sulphide sulphur to elemental form and produce a zinc sulphate bearing leach-end solution which, after purification, is subjected to electrolysis to recover cathode zinc and produce a return electrolyte containing residual zinc values and sulphuric acid, the improved procedure for obtaining rapid and substantially complete extraction of zinc from said sulphides and for producing a leach-end solution low in dissolved iron and free acid which comprises conducting said pressure leaching under a positive partial pressure of oxygen and at a temperature above about 135° C. but below about 175° C. in two countercurrent stages with said mineral sulphides being fed into the first of said two leaching stages and said return electrolyte being fed into the second of said two leaching stages; adjusting and co-relating the quantity of said mineral sulphides fed into said first leaching stage relative to the quantity of acid fed to said second leaching stage with said return electrolyte such that at least about one mole of zinc in sulphide form enters said first leaching stage for each mole of acid entering said second leaching stage and, at the same time, controlling the quantity of return electrolyte entering said second leaching stage such that about 1 mole of acid enters for each mole of zinc that must be dissolved in said electrolyte to increase the zinc concentration thereof to a predetermined level suitable for treatment of said solution in said electrolysis operation; continuing said first leaching stage to extract zinc values from said mineral sulphides with concurrent conversion of sulphide sulphur to elemental sulphur and to produce a first stage leach residue containing unreacted sulphides, elemental sulphur and precipitated iron and a first stage leach solution having a pH above 1 and containing dissolved zinc, less than about 3 g.p.l. free sulphuric acid and less than 2 g.p.l. of dissolved iron; passing said first stage leach solution to said purification and then to said electrolysis steps and passing said first stage leach residue to said second leaching stage; continuing said second leaching stage to extract substantially all zinc from said first stage leach residue and to produce a second stage leach residue containing any unreacted sulphides, elemental sulphur and precipitated iron and a second stage leach solution containing said extracted zinc, unreacted sulphuric acid and dissolved iron; and separating said second stage leach solution from said second stage leach residue and passing said second stage leach solution to said first leaching stage.

2. The process according to claim 1 wherein said first leaching stage is continued to produce a leach-end solution having a pH above about 2 and containing less than 2 g.p.l. of sulphuric acid and less than 0.5 g.p.l. of dissolved iron.

3. The process according to claim 1 wherein said first and second leaching stages are carried out at a temperature in the range of 130°–160° C. under a positive partial pressure of oxygen above about 100 kPa.

4. The process according to claim 1, wherein the sulphides particle size is about 95% minus 325 mesh standard Tyler screen.

5. The process according to claim 1, wherein about 0.25 g.p.l. of quebracho extract is added to the leach slurry in at least one of the leaching stages.

6. The process according to claim 1, wherein the treated sulphides contain precious metals and said precious metals are recovered in concentrated form with leach residue from said second leaching stage.

* * * * *